(12) United States Patent
Petit et al.

(10) Patent No.: US 9,115,034 B2
(45) Date of Patent: Aug. 25, 2015

(54) CERAMIC PARTICLE MIXTURE, AND METHOD FOR MANUFACTURING CERAMIC PARTS FROM SUCH A MIXTURE

(75) Inventors: Fabrice Petit, Avesnes-sur-Helpe (FR); Véronique Lardot, St-Denis-Bovesse (BE); Cédric Ott, Hergnies (FR); Enrique Juste, Valenciennes (FR); Francis Cambier, Ecaussines-d'Enghien (BE)

(73) Assignee: FIB-Service Intellectual, S.A., Luxembourg (LU)

( * ) Notice: Subject to any disclaimer, the term of this patent is extended or adjusted under 35 U.S.C. 154(b) by 0 days.

(21) Appl. No.: 14/122,815

(22) PCT Filed: May 31, 2012

(86) PCT No.: PCT/EP2012/060261
§ 371 (c)(1),
(2), (4) Date: Dec. 11, 2013

(87) PCT Pub. No.: WO2012/164025
PCT Pub. Date: Dec. 6, 2012

(65) Prior Publication Data
US 2014/0179511 A1   Jun. 26, 2014

(30) Foreign Application Priority Data
Jun. 1, 2011   (EP) ..................................... 11168493

(51) Int. Cl.
*C04B 35/00* (2006.01)
*C04B 35/63* (2006.01)
(Continued)

(52) U.S. Cl.
CPC ......... *C04B 35/6303* (2013.01); *B23K 26/0045* (2013.01); *B23K 26/0084* (2013.01);
(Continued)

(58) Field of Classification Search
CPC ..................... C04B 2235/3217; C04B 35/505; C04B 35/111; C04B 35/115; C04B 35/495; C04B 35/465; C04B 35/4682; C04B 2235/3215
USPC .......................... 501/126, 135, 136, 137, 153
See application file for complete search history.

(56) References Cited

U.S. PATENT DOCUMENTS 5,147,830 A * 9/1992 Banerjee et al. ................. 501/89
5,286,685 A * 2/1994 Schoennahl et al. ......... 501/98.6
(Continued)

OTHER PUBLICATIONS

Yamamoto et al. A novel structure for carbon nanotube reinforced alumina composites with improved mechanical properties. Nanotechnology 19 (2008) 315708 (7pp).*
(Continued)

*Primary Examiner* — Noah Wiese
(74) *Attorney, Agent, or Firm* — Duane Morris LLP; J. Rodman Steele, Jr.; Gregory M. Lefkowitz

(57) ABSTRACT

The invention relates to a ceramic particle mixture containing, as components, a predominant portion by weight of frittable particles made of a ceramic material and particles of at least one additive, at least one additive being a dispersed absorbent solid inorganic material which has, for a laser beam emitted at a predetermined wavelength, a specific absorptivity that is greater than the absorptivity of the other components of the ceramic mixture, and which drastically breaks down when gas is emitted in the presence of the laser beam, said additive being present in proportions of less than 5% of the dry weight. The invention also relates to ceramic parts produced from such a mixture.

10 Claims, 5 Drawing Sheets

Figure 1:

(51) Int. Cl.
   *B23K 26/40* (2014.01)
   *C04B 35/053* (2006.01)
   *C04B 35/111* (2006.01)
   *C04B 35/14* (2006.01)
   *C04B 35/16* (2006.01)
   *C04B 35/447* (2006.01)
   *C04B 35/453* (2006.01)
   *C04B 35/46* (2006.01)
   *C04B 35/468* (2006.01)
   *C04B 35/486* (2006.01)
   *B23K 26/00* (2014.01)
   *B23K 26/06* (2014.01)
   *B23K 26/08* (2014.01)
   *B23K 26/36* (2014.01)
   *B28B 11/12* (2006.01)
   *B28B 17/00* (2006.01)
   *C04B 35/10* (2006.01)
   *C04B 35/48* (2006.01)
   *C04B 35/64* (2006.01)

(52) U.S. Cl.
   CPC ......... *B23K26/0635* (2013.01); *B23K 26/0807* (2013.01); *B23K 26/367* (2013.01); *B23K 26/408* (2013.01); *B28B 11/12* (2013.01); *B28B 17/0036* (2013.01); *C04B 35/053* (2013.01); *C04B 35/10* (2013.01); *C04B 35/111* (2013.01); *C04B 35/14* (2013.01); *C04B 35/16* (2013.01); *C04B 35/447* (2013.01); *C04B 35/453* (2013.01); *C04B 35/46* (2013.01); *C04B 35/4682* (2013.01); *C04B 35/481* (2013.01); *C04B 35/486* (2013.01); *C04B 35/64* (2013.01); *B23K 2201/18* (2013.01); *B23K 2203/08* (2013.01); *C04B 2235/3217* (2013.01); *C04B 2235/3225* (2013.01); *C04B 2235/425* (2013.01); *C04B 2235/5445* (2013.01); *C04B 2235/604* (2013.01); *C04B 2235/665* (2013.01); *C04B 2235/945* (2013.01); *C04B 2235/95* (2013.01)

(56) References Cited

U.S. PATENT DOCUMENTS

| | | | |
|---|---|---|---|
| 7,713,897 B2 * | 5/2010 | Ogunwumi et al. | 501/134 |
| 2007/0006561 A1 | 1/2007 | Brady et al. | |
| 2007/0241303 A1 * | 10/2007 | Zhong et al. | 252/62.3 T |
| 2009/0035554 A1 * | 2/2009 | Fujita et al. | 428/325 |

OTHER PUBLICATIONS

Slocombe A et al: "The effect of pigment addition in diode laser ablation machining of ceramic/polymer composite material", Applied Surface Science, Dec. 15, 2000 Elsevier, Amsterdam, NL—ISSN 0169-4332, XP027317338.

* cited by examiner

CERAMIC PARTICLE MIXTURE, AND METHOD FOR MANUFACTURING CERAMIC PARTS FROM SUCH A MIXTURE

CROSS-REFERENCE TO RELATED APPLICATIONS

This application is a §371 national stage entry of International Application No. PCT/EP2012/060261, filed May 31, 2012, which claims priority to European Patent Application No. 11168493.2 filed Jun. 1, 2011, the entire contents of which are incorporated herein by reference.

The present invention relates to a ceramic particle mixture containing, as components, a predominant portion by weight of sinterable particles made of a ceramic material and particles of at least one additive, at least one of said at least one additive being a solid inorganic material. The invention also relates to a ceramic blank and to a ceramic part in the green or sintered state, on the basis of such a ceramic particle mixture, and to a method for manufacturing ceramic parts from this ceramic mixture.

The process of laser machining by erosion is described by Pham D. T. et coll. in Laser milling, Proc Instn Mech Engrs, Vol. 216 Part B: J. Engineering Manufacture, p. 657-667 (2002). For the machining, the laser irradiation is typically delivered in very brief periods of time on surfaces of reduced dimensions. This results in extremely high peak power densities ($10^{12}$ W/m$^2$) which generate a series of transformations in the irradiated material.

The melting and the vaporisation of the material can be obtained in this way, which creates a machining microcavity locally. The creation, little by little, of a series of such cavities (by virtue in particular of a galvanometric deflector or the movement of motorised spindles) makes it possible to structure the topography of the surface and to progressively reproduce a complex shape. However, this process, well known by the name of "laser milling", suffers from a number of handicaps:

In order for the process to be effective, the material must be absorbent for the wavelength of the laser beam, which requires the laser source to be adapted to the material to be machined.

The machining times can be very long (several dozen hours), even for small or limited volumes of eliminated material (several dozen mm$^3$ for example).

The heating produced by the beam in the part generates a "thermally affected zone" where the properties of the material are locally impaired (formation of a vitreous phase, cracking, creation of undesirable new phases, . . . ). This aspect is particularly critical for ceramic materials, which are considered very fragile, and for which the generation of cracks for example is particularly deleterious from the point of view of their mechanical stability.

Because of these limitations this method is often reserved for the manufacture of single components and in very small quantities (stamping dies, structuring of moulds . . . ).

In the Patent Application WO 2006/079459 a method is described for machining a green body from a stream of material or of energy such as a laser. The proposed machining is carried out on a green ceramic or metal part consisting of an assembly of grains held together by an organic binder. The shaping of the green part is obtained by a conventional process of powder metallurgy also used by ceramicists and widely documented in the literature (pressing, extrusion, etc. . . . ). The incorporation of a binder is likewise known in the prior art which makes it possible to improve the cohesion of the granular assembly. The machining described in this prior-art document is obtained by successive cuts or "slicings" of the green object by the stream of energy or of material.

The patent application DE 19501279 discloses the use of a UV pulsed laser in order to obtain a selective elimination of material.

However, this document emphasises that only limited removal of material is possible by this technique by virtue of the rapid formation of a layer of molten material which is redeposited at the surface. In response to this drawback the document offers the solution of machining the surface in the presence of a fluid in order to avoid this redeposition of the removed material.

In A. Kruusing, Underwater and water-assisted laser processing: Part 1—general features, steam cleaning and shock processing Optics and Lasers in Engineering 41 (2004), p. 307-327, the use of laser surface machining in the presence of a liquid film (often water) is likewise described. During the laser irradiation the liquid film is locally heated abruptly and evaporates explosively, ejecting the slag and the molten particles from the surface of the material.

In the international patent application WO 2010/055277 the principle of machining in a liquid medium is extended to the case of green ceramic or metal components. The machining is performed on granular assemblies of metal or of ceramic (held together by an organic binder) which are immersed in a fluid (water or alcohol) and/or of which the surface is sprayed by such a fluid. Variable periods of immersion (of ½ hour to 24 hours) are required in order to enable the intrusion of the liquid to the core of the green part via its open porosity.

During the laser irradiation very rapid heating of the liquid contained in the green material occurs at the surface of this material. The extremely rapid vaporisation of said liquid ("explosive vaporisation") leads to the local bursting of the structure of the green part. The method was implemented with success on certain ceramic materials (alumina and steatite) but it is incapable of machining cordierite for example. The authors point out that all ceramics are not adapted to this type of machining. Furthermore, the machined depths remain small (less than 1 mm typically) since the diffuse heating of the part quickly causes undesirable evaporation of the liquid. Continuing with this machining requires renewed immersion of the part or continuous spraying of the liquid onto the surface to be machined. The method appears particularly onerous to implement for at least three reasons:

The rapid evaporation of the solvent limits the machining depths to a fraction of a mm. The method is not applicable to certain ceramic materials. It is necessary to machine the components immediately after their emergence, as intermediate storage should be excluded in view of the natural evaporation of the liquid used.

The patent application US 2010/0032417 mentions green machining by UV laser (wavelength less than 400 nm) for the stripping/cleaning of "solder pad" or the drilling of holes in devices intended for microelectronics. One embodiment provides a method of machining by explosive vaporisation of the organic binder present in the green mass. The organic vapours at high temperature expand at high speed and break down the green material locally by ejecting matter. In this document, the organic phase which enables the green machining is the binder well known to ceramicists which makes it possible to ensure the cohesion of the grains with one another and increases the mechanical resistance of the part.

In J. Gurauskis et coll., Laser drilling of Ni—YSZ Cements, Journal of the European Ceramic Society 28(2008), p. 2673-2680, the authors describe in detail the procedure of laser perforation of a green ceramic part. The particles of ceramic material absorb the laser radiation, which causes their temperature to rise rapidly. Heat is then transferred to the organic binder which pyrolises, producing a jet of gas. The gaseous explosion entrains with it the matter which surrounds the treatment site.

A comparable method is described in Kamran Imen et al., Pulse $CO_2$ Laser Drilling of Green Alumina Ceramic, IEEE Transactions on Advanced Packaging, Vol. 22, no. 4, November 1999. The exposure to the laser radiation is effected here under pressure.

This examination of the prior art shows that in the case of methods of machining by erosion under the effect of laser radiation of a green ceramic part shaped from a ceramic particle mixture there is always a rapid heating of the particles of ceramic material. This heating is used to advantage in order to vaporise a liquid phase which, simultaneously, is intended to protect the ceramic material from excessive heating, or in order to pyrolise in the form of a gaseous jet the organic binder which keeps the ceramic particles together.

The ceramic materials are not particularly adapted to absorb laser radiation in the wavelengths between 200 nm and 3 μm. The absorptivity of the ceramic materials, in particular of the oxide type, is often mediocre in this wavelength range. Any laser radiation emitting in this range must therefore be sufficiently powerful and prolonged so that the transfer of heat from the energy absorbed by the ceramic material to the liquid phase or to the binder has the effect of explosive vaporisation of these phases accompanied by a tearing of material. This results in the danger that partial melting of the ceramic particles occurs during a poorly controlled process, which should be avoided, and a certain slowness in the machining process. In addition, in the case where organic binder polymer is used, this latter has the drawback of uncontrolled creep and melting in the thermally affected zone. Moreover, in a wavelength range extending beyond 3 μm (far infrared) the absorptivity of the ceramic material as well as that of the binder or of the liquid phase are considerably higher, which leads to combined heating of the two materials and to the drawbacks mentioned above.

Ceramic mixtures are also known which contain a large quantity of combinations of porogenic agents, one of which may be formed of carbon. These mixtures are shaped and fired, in particular in order to produce porous systems for treatment of exhaust gases from cars (see US 2007/0006561) and they do not undergo any green machining by laser treatment.

The object of the present invention is to develop a ceramic particle mixture which enables green machining of ceramic parts having complex shapes from simple shapes. This machining should be very flexible and very quick to carry out, without exhibiting the drawbacks of treatments according to the prior art.

These problems are solved according to the invention by a ceramic particle mixture such as indicated at the beginning. In this mixture, said inorganic solid material is absorbent for laser radiation emitting a predetermined energy flow at a predetermined wavelength, and at this predetermined wavelength has a specific absorptivity greater than that of the other components of the ceramic mixture, and said ceramic mixture contains the particles of absorbent inorganic solid matter in the dispersed state, in proportions of less than 5% and more than 0% by weight of the dry mixture, the particles of absorbent inorganic solid matter being degradable abruptly, with gaseous emission, in the presence of said laser radiation.

In the event of exposure of this ceramic particle mixture to the above-mentioned laser radiation, these are not therefore sinterable particles of ceramic material which will directly and preferentially absorb the energy flow, but particles of a mineral additive selected for this purpose which will be referred to below as absorbent dispersed solid material ADSM. These particles touched by the laser radiation can degrade in gaseous form in extremely short periods of time, in particular less than a microsecond. In particular, pulsed lasers of the nanosecond type (pulsation durations below 150 ns) emitting in the vicinity of 1 μm and of average power (typically from 5 to 100 W of average power) are very appropriate for this purpose. Any risk of untimely heating, even local, of the surrounding ceramic material is thus avoided and the machining times can be very short.

The coefficient of absorption A or absorptivity is a fundamental property governing the interaction between an electromagnetic radiation and a surface affected by this latter. It is given by:

$$A=1-R$$

where R is the reflectivity of the surface of the irradiated material.

This quantity without units depends upon the wavelength of the incident radiation. It is between 0 (no absorption) and 1 (complete absorption). (See: Ready J. F. (ed.), LIA handbook of laser materials processing, Laser Institute of America, Magnolia Publishing Inc., 2001, as well as Oliveira C. et al., Etude de l'absorption du rayonnement IR en vue du traitement laser d'alliages ferreux, J. Phys. III France, 2 (1992), 2203-2223).

By the incorporation of a mass fraction of ADSM of less than 5% by weight of the dry mixture two objectives are ensured: efficient machining as indicated above, but also the most complete possible densification of the part to be machined, advantageously 100% of the theoretical density.

Preferably, in the ceramic particle mixture according to the invention the absorbent dispersed inorganic solid material has, relative to the other components, an absorptivity differential of the laser radiation which is greater than 0.2, advantageously equal to or greater than 0.4, preferably equal to or greater than 0.5. Advantageously, the absorbent dispersed solid material is a non-binding material. It should be noted that the ceramic particle mixture according to the invention can contain, as another additive, at least one binder for the particles of ceramic material. It is possible to envisage any type of binder known in the art, in particular an organic binder which may be in the form of inherently sticky particles distributed among the sinterable particles of ceramic material or coating these particles. The content of organic binder incorporated in the mixture according to the invention is preferably less than 5% by weight of the dry mixture, in particular less than 3% by weight.

According to one embodiment of the invention, the absorbent dispersed solid material is stable in the absence of thermal and/or optical stresses. The ceramic particle mixture can therefore be stored without problems in normal conditions, in particular at ambient temperature and in the absence of exposure to laser radiation. It can be in the form of a powder, preferably totally dry, or a suspension of particles in a liquid suspension medium, for example an aqueous medium, such as water. The ADSM is advantageously totally degradable in controlled thermal conditions, higher than 400° C. Thus after green machining of the ceramic part shaped from the ceramic particle mixture it is possible to make any trace of the absorbent dispersed inorganic solid material completely disappear before the step of sintering the part.

According to the invention, the absorbent dispersed inorganic solid material may be totally or at least partially carbon. Carbon may be advantageously chosen from among the group consisting of graphite, anthracite, carbon black, activated charcoal, carbon nanotubes, graphene foils and mixtures thereof. It is also possible to envisage an organic phase charged with a dispersion of carbon, for example graphite or carbon black.

An ADSM of choice for the machining of green ceramic parts is carbon and its derivatives. Carbon has a high coefficient of absorption or absorptivity in a wide range of frequencies accessible to modern laser sources, in particular between 200 nm and 3 µm. Irradiated in pulsed mode, carbon degrades violently with gaseous emission which bursts the structure of the surrounding green material causing the ejection of particles of ceramic material. A dispersion of carbon of micrometer or submicron dimension (d90<5 µm, preferably <1 µm) is advantageous since it enables excellent homogeneity of the green material. In general, regardless of the nature of the dispersed ADSM, the smaller the size of its particles, the smaller and better the homogeneity of the green material may be. The quantity of carbon required for an effective green machining will likewise be less with a dispersion of smaller particle size.

Carbon has the advantage of excellent absorption of laser energy in an extended range of wavelengths (from UV to far IR) and it is therefore compatible with machining by pulsed laser of the nanosecond type, for example excimer, Nd:YAG, Nd:YVO$_4$, fibre laser or the like. In the wavelength range between 200 nm and 3 µm, the coefficient of absorption of carbon exceeds the value of 0.7.

The sinterable particles of ceramic material are preferably totally or at least partially of ceramic material of the oxide type. As ceramic material, mention may be made in particular of alumina, zircon, silica, magnesia, zinc oxide, titanium oxide, mixed oxides such as PZT, barium titanate, silicates, hydroxyapatite, tricalcium phosphate and mixtures thereof.

The sinterable particles of ceramic material may advantageously have a micron or submicron particle size.

The mass fraction of ADSM incorporated in the ceramic particle mixture according to the invention may advantageously be between 1% and 3% by weight of the dry mixture.

The present invention also relates to ceramic blanks and to ceramic parts machined in the green state which are based on a ceramic particle mixture according to the invention. It also relates to the sintered ceramic parts obtained after sintering of ceramic parts machined in the green state according to the invention. The invention also relates to a method for manufacturing ceramic parts, both in the green state and in the sintered state, from a ceramic particle mixture according to the invention.

The machined ceramic parts according to the invention may in particular be components intended for electronics, electromechanics, for the biomedical field (dental prostheses, bone substitutes, etc.), the manufacture of extrusion dies, jewelry, precision mechanics, filtration, catalysis supports and the like.

According to the invention this method comprises implementation of a ceramic particle mixture according to the invention containing, as components, a predominant portion by weight of sinterable particles made of a ceramic material and particles of at least one additive, at least one of said at least one additive being a solid inorganic material.

In the method according to the invention, said inorganic solid material is absorbent for laser radiation emitting a predetermined energy flow at a predetermined wavelength, and at this wavelength has a specific absorptivity greater than that of the other components of the ceramic mixture, said ceramic mixture containing the particles of absorbent inorganic solid matter in the dispersed state, in proportions of less than 5% by weight and more than 0% by weight of the dry mixture. The method according to the invention further comprises green shaping of this ceramic mixture and obtaining a dry green ceramic blank, green machining of the green ceramic blank, by removal of ceramic material, by its exposure to said pulsed laser radiation emitting a predetermined energy flow at said predetermined wavelength, and—during said exposure to this laser radiation, direct selective absorption of the laser radiation energy by the particles of absorbent dispersed inorganic solid material which degrade abruptly, with gaseous emission, local dislocation of ceramic material from the green ceramic blank, ejection of this dislocated ceramic material and obtaining a machined ceramic part in the green state.

In order to produce the ceramic particle mixture, the components thereof, and therefore of necessity the particles of the ceramic material(s) and of the absorbent dispersed inorganic solid material, can be mixed by dry means, which gives a dry powder. It is also possible to mix them by liquid means by putting the components in suspension. In this case provision may be made for drying the mixture in suspension in a known manner, for example in an oven, a furnace, by freeze-drying or atomisation, before the shaping, in order likewise to obtain a dry powder for the shaping.

Advantageously the green shaping is performed by techniques known to the person skilled in the art, for example by extrusion, casting or pressing. In the case of extrusion or casting, the ceramic mixture is implemented in the form of a paste or a suspension and, in this case, the step of drying indicated above is then performed after the shaping. In all cases a dry green ceramic blank is obtained which is intended for machining.

After shaping of this dry green ceramic blank, the green mass can be readily machined by laser. The laser radiation is pulsed and can originate from any appropriate laser source emitting in the UV, IR or the visible range. The laser radiation may advantageously have a wavelength of 200 nm to 3 µm, in particular 900 nm to 1100 nm. Pulse durations less than 150 ns may preferably be provided. When machining takes place in the presence of an oxidising atmosphere the absorbent dispersed solid material exposed to the laser radiation can be oxidised in the form of a gas. In a particularly advantageous manner, machining may take place at ambient pressure, in air.

The method may also comprise, after green machining, sintering of the particles of ceramic material of the green machined ceramic part. The sintering temperature will depend upon the nature of the particles of ceramic material.

Provision may advantageously be made, before the sintering, for elimination of the absorbent dispersed inorganic solid material outside the green machined ceramic part by thermal stress thereon at a degradation temperature of this material. In this case, the sintered ceramic part is totally devoid of ADSM, like the sintered ceramic parts according to the prior art, but without exhibiting the defects of the latter, such as microcracks, deposit of vitreous material, etc.

The invention will now be described in greater detail with the aid of non-limiting examples.

Figure 2:
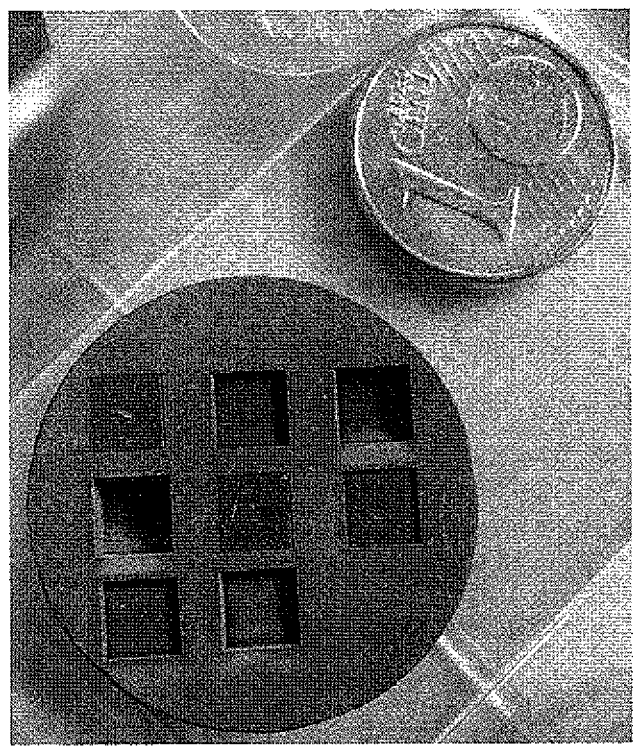
Figure 3:
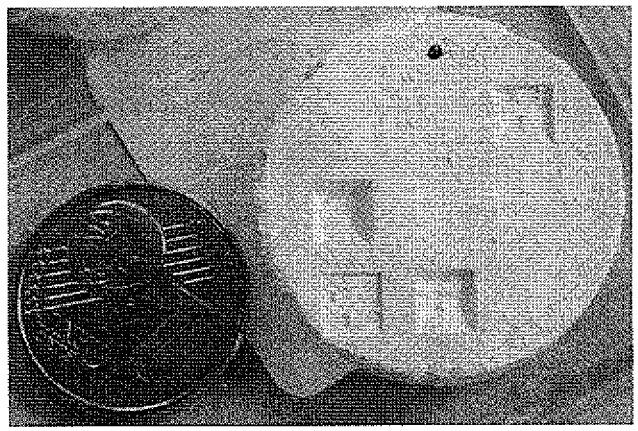
Figure 4:
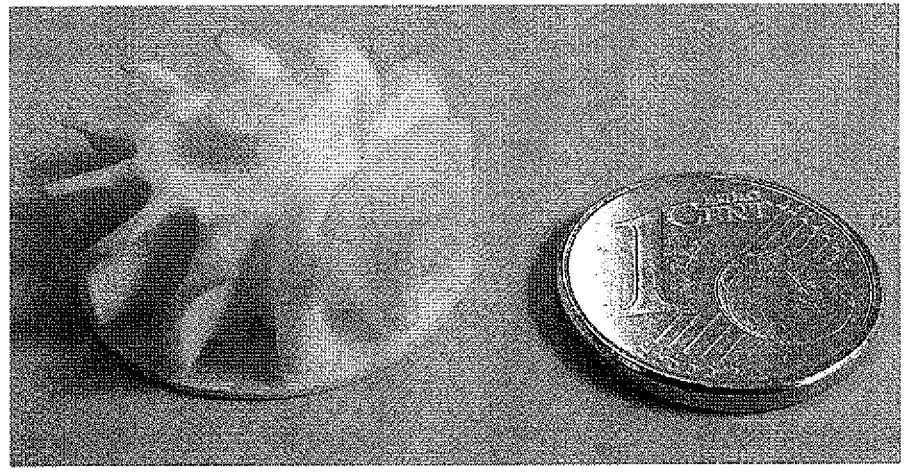
Figure 5:
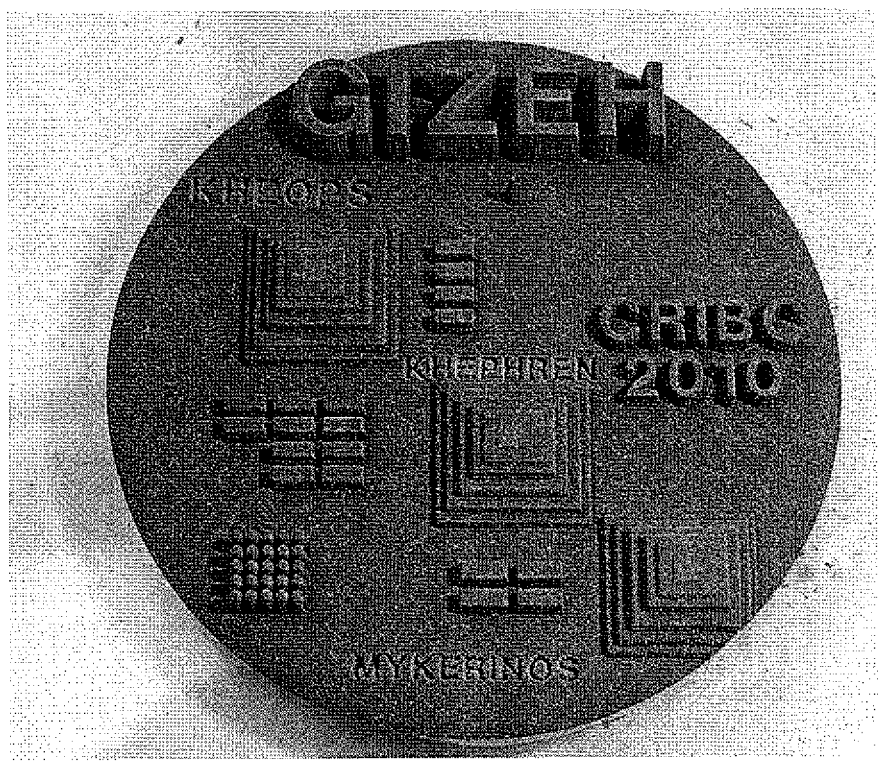
Figure 6:
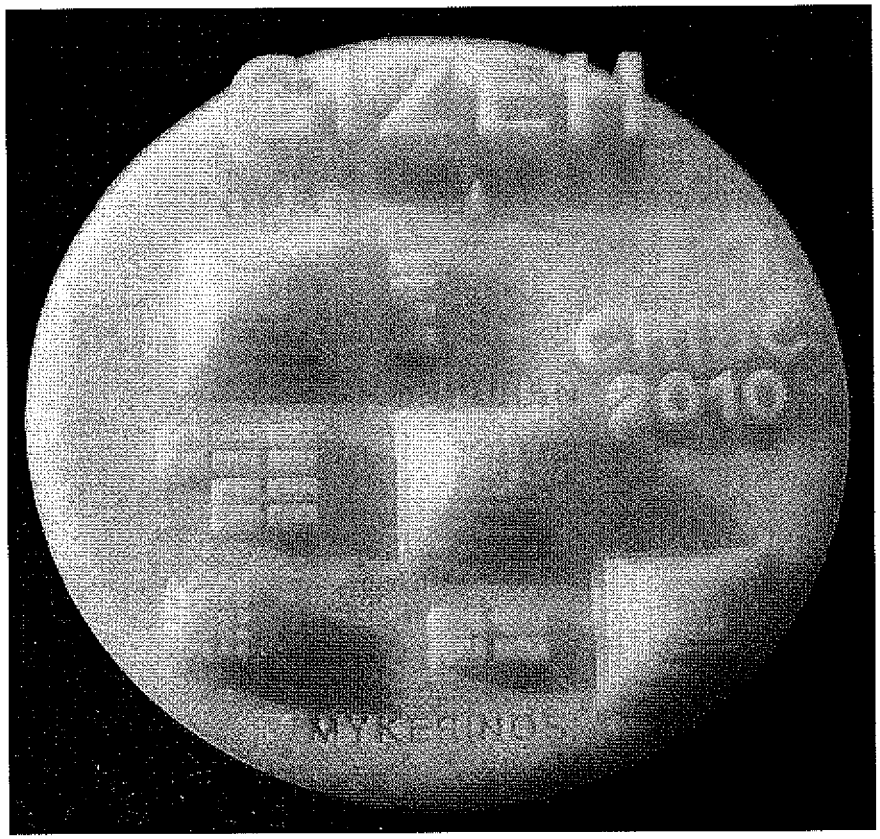

The appended FIGS. 2 and 5 illustrate machined parts according to the invention before sintering, FIGS. 1, 4 and 6 show parts machined according to the invention after sintering and FIG. 3 shows a green machined part without ADSM.

EXAMPLE 1

Green Machining of a Fine Alumina by Nd:YVO$_4$ Laser

A defined quantity of alumina (P172SB from Pechiney) is weighed (100 g) and put in suspension at natural pH in demineralised water (100 g). 1% by mass of polyethylene glycol PEG is added to the suspension (i.e. 1 g) in order to serve as organic binder. 23.5 g of an aqueous suspension of a colloidal graphite (Aquadag 18%—Acheson Industries Ltd) are added to the suspension of alumina particles, everything is mixed for 30 minutes then dried either by freeze-drying or with a rotary evaporator. Thus a dry mixture is obtained containing 4.2% by weight of graphite relative to the total weight of the mixture. The graphite particles have a particle size of d90<5 µm and the alumina particles have a particle size of d50=0.4 µm.

The mixed powder thus obtained is shaped by uniaxial pressing (40 MPa applied to tablets of 25 mm diameter), followed by isostatic post-compaction (170 MPa for 2 min).

The green blanks obtained in the form of tablets are then, at ambient pressure, machined by laser from a Trumark commercial marking station (Trumpf) equipped with a solid Nd:YVO$_4$ laser of 20 W nominal power provided with a Q Switch, making it possible to work in pulsed mode, of a motorised table XY and a galvanometric head enabling the beam to sweep over the surface to be machined. The optics with a focal length of 163 mm enables a spot of 45 µm to be obtained. The optimum lasing parameters obtained on the basis of a parametric study are 40%-80% of nominal power, a working frequency of 40-80 kHz, a sweep speed of 100-6000 mm/s, an interval between pulses of 1 to 5 µs and pulse durations between 8 and 17 ns. The machining is performed based on a CAD file of format .dxf for example.

The laser emits radiation having a wavelength of 1.06 µm. At this wavelength alumina has an absorptivity of approximately 0.1 whilst that of carbon rises to about 0.9.

The results obtained, illustrated in FIG. 1 after sintering, reveal the possibility of machining finely perforated grids (hole diameter 100 µm spaced by 60 µm) at depths of the order of 1 mm and also very deep machining to depths easily exceeding 5 mm. The only limit identified for the machining depth is given by the aspect ratio of hole width/depth which is close to 1/10 for the focusing optics used. The recorded rates of removal of material are of the order of 10-100 mm$^3$ per min.

The machined green parts are next heat treated in air in two steps: the first step seeks to totally eliminate the residual carbon in the part; the second step relates to sintering the alumina. A heat treatment cycle including a stage of 1 hour at 600° C. (rate of increase of 5° C./min) followed by a stage at 1550° C. for 1 hour (rate of increase of 5° C./min) and finally a lowering to ambient temperature (at 5° C./min) makes it possible to obtain a perfectly dense part, devoid of visible defects (pores or cracks). The machined surfaces observed under a scanning electron microscope revealed no crack, no porosity, nor any layer of redeposited molten material.

With this alumina, analogous comparative tests have been performed on green blanks with and without ADSM. A machined green blank according to the invention is illustrated in FIG. 2. It has neat cavity edges and the bottoms of the cavities are perfectly clean. The greyish colour of the blank is caused by the presence of graphite as ADSM. After sintering and degradation of the graphite the part will have a colour identical to that obtained on the blank of FIG. 1. The green blanks without ADSM have revealed the possibility of performing green machining (see FIG. 3). However, peak powers higher than those provided for the green machining with ADSM are then required (typically >60-80% of the nominal power). Moreover, the rates of removal of material are much lower than those obtained in the presence of ADSM (decreased by a factor 3 as a minimum). Likewise, the depths which can be machined are much reduced and cannot exceed 2 mm: the grains of alumina quickly start to sinter, or even to melt, under the effect of the power provided by the beam, which stops the green machining process. The green machining in the absence of ADSM is explained by the superficial vaporisation of the grains of alumina in the zone irradiated by the beam which creates stresses causing the structure to explode locally.

EXAMPLE 2

Green Machining of a Fine Zircon by Nd:YVO$_4$ Laser

Unlike the alumina P172 used in the preceding example, tests of green machining on pressed tablets of zircon (Tosoh Y-TZP) have revealed the impossibility of machining without ADSM.

Machining of the zircon by incorporation of ADSM of the graphite type.

The recipe which enabled the green machining is similar to that of alumina: 100 g of zircon (d50=200 nm) are dispersed in 100 g demineralised water in which 1 g of PEG 2000 was previously dissolved. 14 g of Aquadag (d90<5 µm) are then added to the suspension, then the whole mixture is homogenised for 30 min in the presence of grinding media. The suspension is then dried by freeze-drying or by rotary evaporator which gives 2.4% by weight of carbon relative to the dry mixture. The powder obtained is pressed in the form of tablets of 25 mm diameter under a uniaxial pressure of 40 MPa, then the tablets are isostatically post-compacted at 175 MPa.

The green tablets obtained are then machined by laser from the same marking station as in the previous example. The optimum lasing parameters obtained on the basis of a parametric study are similar to those obtained for alumina, namely 40%-80% of nominal power, a working frequency of 40-80 kHz, a sweep speed of 100-6000 mm/s, an interval between pulses of 1 to 5 µs and pulse durations between 8 and 17 ns. The machining is performed based on a CAD file of format .dxf for example.

At the wavelength of 1.06 µm of the laser radiation, zircon has an absorptivity of 0.2 whilst that of graphite is of the order of 0.9.

Again, very high rates of removal of material were able to be recorded (>50 mm$^3$/min) to depths of several mm.

In this case too, no apparent limit for the depth other than the aspect ratio of the machined zones was noted. Various machining patterns have been implemented involving the creation of fine and/or rough details. The machining precision proved to be of the order of the size of the laser beam at the focal length.

After elimination of the residual carbon in air and natural sintering of the machined parts, no apparent defect was noted.

The machined surfaces observed under a scanning electron microscope revealed no crack, no porosity, nor any layer of redeposited molten material.

Certain untreated tablets were stored in air for several days, then machined. The same behaviour during machining was noted as on the original tablets—proof of the absence of ageing of the tablets. For long periods of storage of pressed parts, on the other hand, said parts could be placed in an airtight space in the presence of a desiccant in order to avoid humidification thereof by the ambient air.

EXAMPLE 3

Green Machining of a Fine Alumina by 3D Laser

A mixed powder of fine alumina P172SB from Pechiney was prepared containing 10% by volume (or approximately 4% by weight) of carbon (Aquadag) according to the procedure illustrated in Example 1. Tablets of 25 mm diameter were pressed by uniaxial pressing at a load of 40 MPa. These tablets were then treated by pulsed Nd:YAG laser of the nanosecond type provided with a galvanometric head and 5 motorised spindles (3 cartesian spindles and 2 rotatable spindles). A CAD plan of a radial microturbine was edited and the object was reproduced by micromachining using the parameters detailed in Example 1. Each of the turbine blades was produced one after the other by successive rotation of the tablet. In this example, the machining time of the microturbine is of the order of 20 min. The elimination of the graphite and the sintering of the object were performed according to the procedure of Example 1.

The result obtained is presented in FIG. 4 which illustrates the machined microturbine after elimination of the ADSM and sintering. The object obtained is devoid of apparent defects (crack, porosity . . . ) and the part after sintering is totally dense.

EXAMPLE 4

3D Green Laser Machining of Zircon

Pressed tablets obtained on the basis of the procedure of Example 2 were machined layer by layer, each layer corresponding to a specific machining plan. The machining of the pyramids shown in FIG. 5 takes 20 min. The top of the obelisk below the letters Z and E has a cross-section of the order of 50 µm, hardly more than the size of the beam at the focal distance.

FIG. 6 shows a machined tablet after elimination of the ADSM and sintering. As can be seen, after sintering no geometric distortion of the part is noted. The machined pyramids as well as the obelisk are intact and devoid of apparent defects.

It should be understood that the present invention is in no way limited to the embodiments described above and that modifications can be made thereto within the scope of the appended claims.

The invention claimed is:

1. Method for manufacturing ceramic parts comprising
   implementation of a ceramic particle mixture, as components, a predominant portion by weight of sinterable particles made of a ceramic material and particles of at least one additive, at least one of said at least one additive being a solid inorganic material,
   wherein said inorganic solid material is absorbent for laser radiation emitting a predetermined energy flow at a predetermined wavelength, and at this wavelength has a specific absorptivity greater than that of the other components of the ceramic mixture, in that said ceramic mixture contains the particles of absorbent inorganic solid matter in the dispersed state, in proportions of less than 5% by weight and more than 0% by weight of the dry mixture, and in that the method further comprises
   green shaping of this ceramic mixture and obtaining a dry green ceramic blank,
   green machining of the green ceramic blank, by removal of ceramic material, by its exposure to said pulsed laser radiation emitting a predetermined energy flow at said predetermined wavelength, and
   during said exposure to this laser radiation, direct selective absorption of the laser radiation energy by the particles of absorbent dispersed inorganic solid material which degrade abruptly, with gaseous emission, local dislocation of ceramic material from the green ceramic blank, ejection of this dislocated ceramic material and obtaining a machined ceramic part in the green state.

2. Method according to claim 1, wherein the particles of the components are mixed by dry means, forming a powder.

3. Method according to claim 1, further comprising putting the particles of the components in suspension in a liquid suspension medium.

4. Method according to claim 1, wherein the green shaping is performed by extrusion, casting or pressing of the ceramic mixture used.

5. Method according to claim 1, wherein the pulsed laser radiation has a wavelength of 200 nm to 3 µm.

6. Method according to claim 5, wherein the pulsed laser radiation has a wavelength of 900 nm to 1100 nm.

7. Method according to claim 1, wherein the pulsed laser radiation has pulse durations less than 150 ns.

8. Method according to claim 1, further comprising, after green machining, sintering of the particles of ceramic material of the green machined ceramic part.

9. Method according to claim 8, further comprising, before the sintering, elimination of the absorbent dispersed solid material outside the green machined ceramic part by thermal stress thereon at a degradation temperature of this material.

10. Method according to claim 1, wherein the green machining takes place at ambient pressure, in air.

* * * * *